March 9, 1926.  
C. E. E. LAUBACH  
STEERING WHEEL  
Filed July 13, 1925

1,575,848

WITNESSES

Inventor
CLINTON E. E. LAUBACH

By Richard B. Owen
Attorney

Patented Mar. 9, 1926.

1,575,848

UNITED STATES PATENT OFFICE.

CLINTON E. E. LAUBACH, OF POTTSVILLE, PENNSYLVANIA.

STEERING WHEEL.

Application filed July 13, 1925. Serial No. 43,365.

*To all whom it may concern:*

Be it known that I, CLINTON E. E. LAUBACH, a citizen of United States, residing at Pottsville, in the county of Schuylkill and State of Pennsylvania, have invented certain new and useful Improvements in Steering Wheels, of which the following is a specification.

This invention relates to steering wheels, and has for its object the production of a simple and efficient attachment for steering wheel of an automobile which will facilitate the driving of an automobile, and at the same time will permit the driver to rest his arm while driving.

Another object of this invention is the production of a simple and efficient grip means, which is attached to the periphery of the wheel, and which projects radially therefrom to permit the hand of the driver to conveniently grip the wheel.

With these and other objects in view, this invention consists of certain combination and arrangements of parts as will be hereinafter more fully described and claimed.

By referring to the drawings, it will be seen that—

Figure 1:
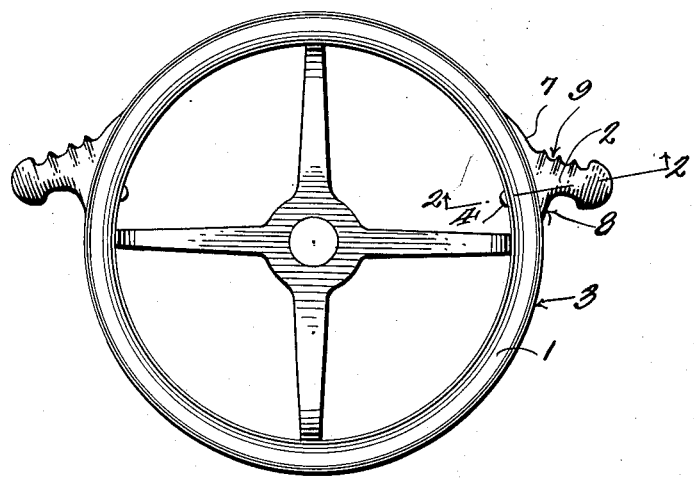
Figure 1 is a top plan view of the steering wheel.

By referring to the drawings, it will be seen that 1 designates a steering wheel of suitable construction, which is provided on each side, near the top thereof, with a knob or grip-portion 2, these grip-portions or knobs 2 being preferably secured to the periphery 3 of the wheel 1 at a point above the central axis of the wheel.

Figure 2:
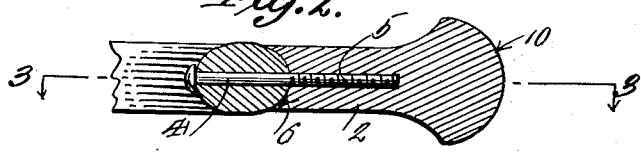
Figure 2 is a section taken on line 2—2 of Fig. 1.
Figure 3:
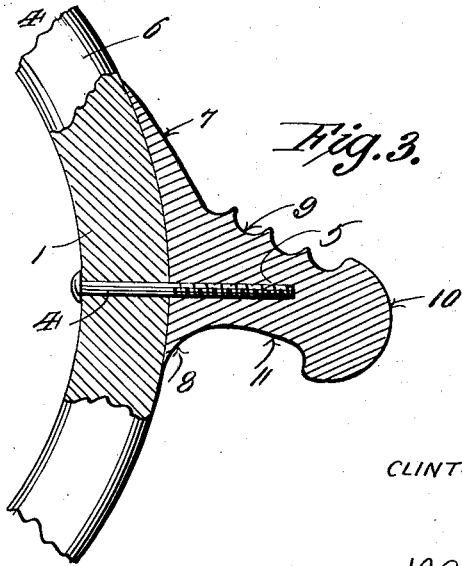
Figure 3 is an enlarged horizontal section through a portion of the wheel, the grip-portion being also shown in section.

By particularly considering the Figures 2 and 3, it will be seen that these knobs 2 are secured to the rim of the wheel 1 by means of securing screws 4, these screws being threaded as indicated at 5 longitudinally through the knob 2, and extending for quite a distance throughout the entire length of the knobs, thereby efficiently bracing the same. The inner ends of the knobs 2 are concave as indicated at 6, so as to conform to the contour of the outer periphery of the wheel 1. Each knob 2 is also provided with a forwardly-extending tapering portion 7, which is so constructed as to merge into the edge of the wheel and produce a smooth surface at the junction of the wheel and knob 2. The rear face of each knob 2 also is slightly curved, as indicated at 8 for the purpose of merging into the surface of the wheel 1 and produce a smooth joint at all points of junction between the knobs 2 and the periphery of the wheel 1.

Each knob 2 is provided with a plurality of finger sockets 9 upon the upper face thereof, and an enlarged head portion 10 at the outer end thereof, for the purpose of facilitating the gripping of the knob and preventing the accidental slipping of the hand of the operator from the knob 2. Each knob 2 is also provided with an enlarged cut-away portion 11, constituting a thumb-receiving pocket, thereby permitting an efficient grip to be obtained upon the knob 2 by the hand of the operator.

It should be understood that certain detail changes in mechanical construction may be employed without departing from the spirit of the invention, so long as these changes fall within the scope of the appended claim.

Having described the invention, what is claimed is:

In combination with a steering wheel, having a periphery convex in cross section, of a plurality of gripping knobs secured to said steering wheel. each knob provided with a concave surface at one end for contact with said steering wheel and snugly fitting the periphery of the steering wheel, a securing screw passing transversely through the steering wheel rim and longitudinally through each knob, each knob provided with finger-receiving sockets formed therein, and an enlarged outer end to facilitate the gripping of the knobs by the hand of the operator, and the inner end of each knob provided with outwardly spread portions, merging into the periphery of the wheel to form a continuous surface from the periphery of the wheel on to the outer surface of each knob.

In testimony whereof I affix my signature.

CLINTON E. E. LAUBACH.